US012608076B2

(12) United States Patent
You

(10) Patent No.: US 12,608,076 B2
(45) Date of Patent: Apr. 21, 2026

(54) VIRTUAL AND AUGMENTED REALITY SYSTEM WITH PORTABLE WALKER

(71) Applicant: Christine You, Redwood City, CA (US)

(72) Inventor: Christine You, Redwood City, CA (US)

( * ) Notice: Subject to any disclaimer, the term of this patent is extended or adjusted under 35 U.S.C. 154(b) by 0 days.

(21) Appl. No.: 18/823,691

(22) Filed: Sep. 4, 2024

(65) Prior Publication Data

US 2025/0076968 A1 Mar. 6, 2025

Related U.S. Application Data

(60) Provisional application No. 63/580,435, filed on Sep. 5, 2023.

(51) Int. Cl.
*G06F 3/01* (2006.01)
*G06F 3/041* (2006.01)

(52) U.S. Cl.
CPC .............. *G06F 3/011* (2013.01); *G06F 3/041* (2013.01); *G06F 2203/012* (2013.01); *G06F 2203/04105* (2013.01)

(58) Field of Classification Search
CPC ........... G06F 3/011; G06F 2203/04105; G06F 3/041; G06F 3/044; G06F 3/045; G06F 3/0414; A63B 2022/0271; A63B 22/02; A63B 22/0235; A63B 2022/0278; A63B 22/0285; A63B 2220/13; A63B 2071/0638; G09B 9/00; A63F 2300/8082; A63F 13/214
See application file for complete search history.

(56) References Cited

U.S. PATENT DOCUMENTS

| | | | | |
|---|---|---|---|---|
| 2003/0208324 | A1* | 11/2003 | Bellwood | ............... G06F 3/023 |
| | | | | 702/41 |
| 2003/0232698 | A1* | 12/2003 | Couvillion, Jr. | ........ G06F 3/011 |
| | | | | 482/4 |
| 2005/0104855 | A1* | 5/2005 | Grossmeyer | .......... G06F 3/0412 |
| | | | | 345/169 |
| 2006/0139317 | A1* | 6/2006 | Leu | .......................... G06F 3/016 |
| | | | | 345/156 |
| 2018/0067642 | A1* | 3/2018 | Stemple | .................. G06F 3/011 |
| 2023/0409192 | A1* | 12/2023 | Mao | ....................... A63F 13/214 |

* cited by examiner

*Primary Examiner* — Koosha Sharifi-Tafreshi

(57) ABSTRACT

A VR system comprises a tracking pad, a walker, a rail.

12 Claims, 19 Drawing Sheets

VR Headset
100

Control Station
105

Electric Brake
130

Grip Handle
145

Tray
140

Tracking Pad
120

Height Adjust
135

Rail
115

Walker
125

Hub Station
110

Hub Station 110

T bar groove 165

Slot for power cord 170

Screws for assembly 175

Tracking Pad 120

Rail 115

Folding Board 117

Tracking Pad (120) Component

Polyester with PU coating
210

Carbon print
Circuit for buttons
220

Velostat / Linqstat
or Foam　230

Carbon print
240

Adhesive
250

IR Transmitter LED array
260

External case
270

Copper strips
or Conductive print
280

IR Transmitter LED array
290

IR Transmitter LED
300

Handle for walker
310

Electric brake lever
320

Battery
330

IMU sensor
340

IR sensor module
350

Microcontroller
WIFI / Bluetooth LE
360

Velostat /Linqstat
370

Polyester
with PU coating
380

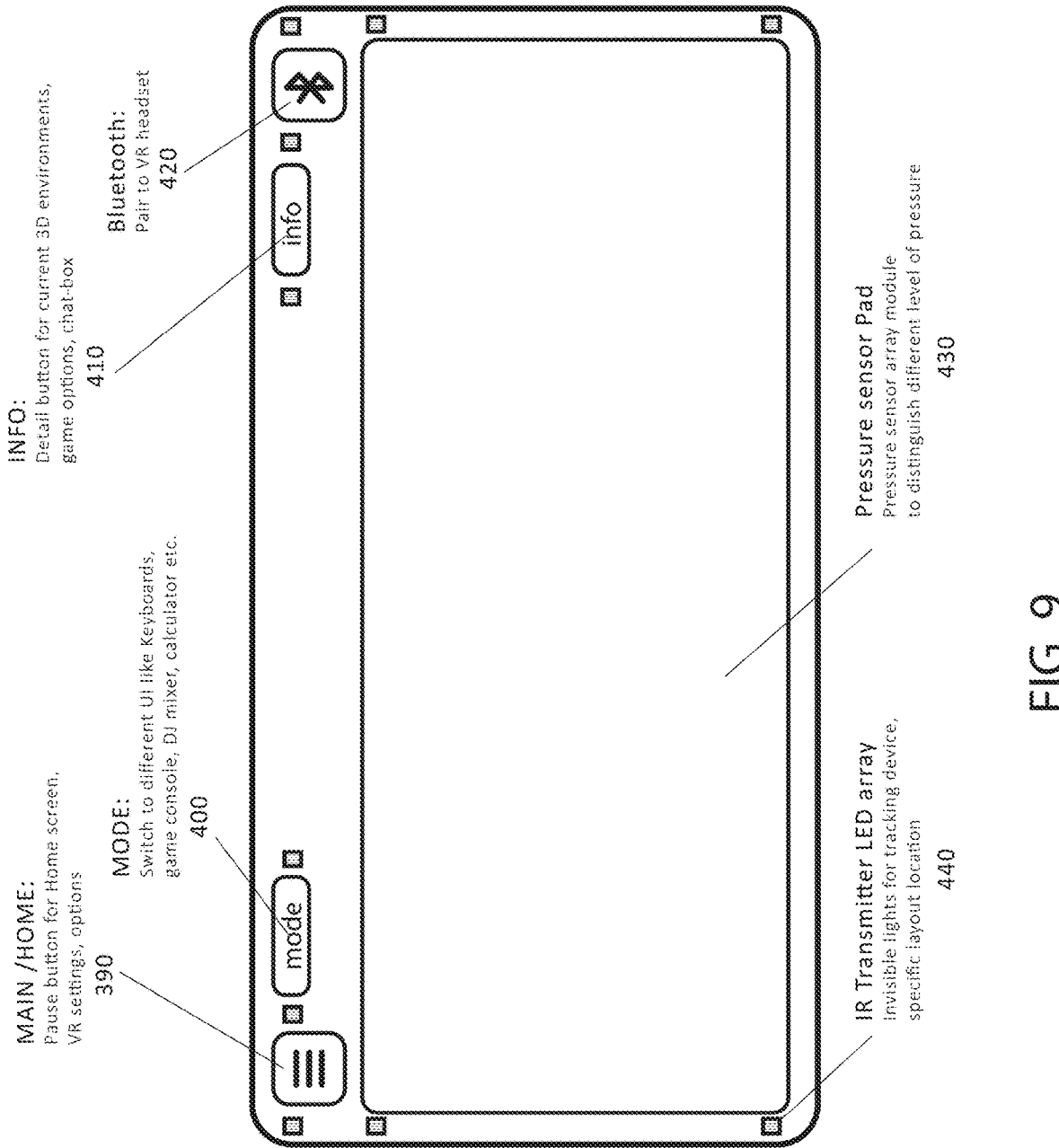

INFO:
Detail button for current 3D environments, game options, chat-box
410

Bluetooth:
Pair to VR headset
420

MAIN /HOME:
Pause button for Home screen, VR settings, options
390

MODE:
Switch to different UI like Keyboards, game console, DJ mixer, calculator etc.
400

Pressure sensor Pad
Pressure sensor array module to distinguish different level of pressure
430

IR Transmitter LED array
Invisible lights for tracking device, specific layout location
440

FIG. 9

Virtual Reality
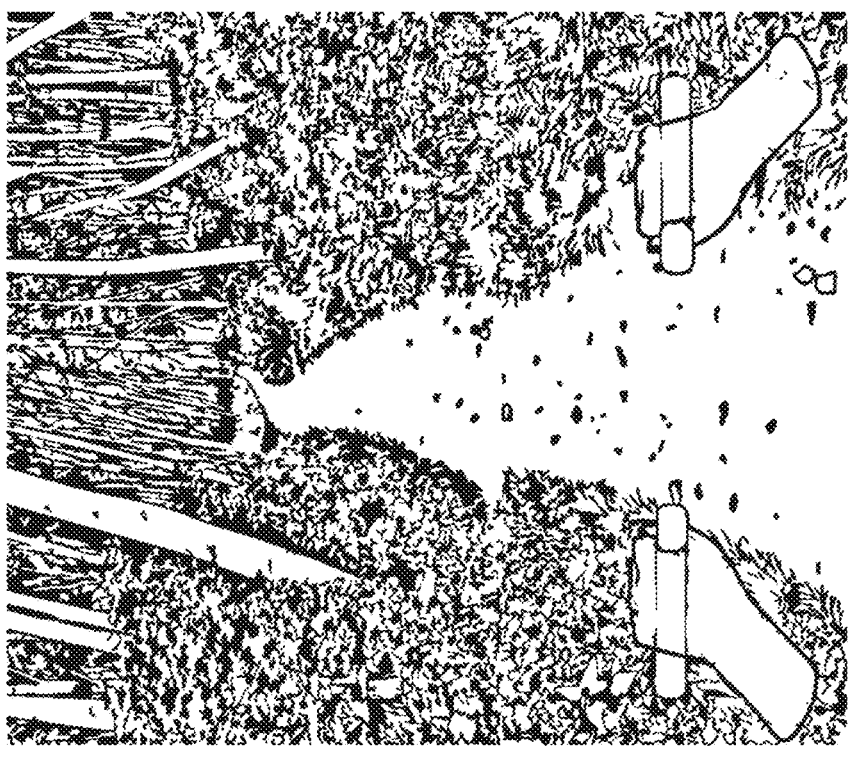
Reality
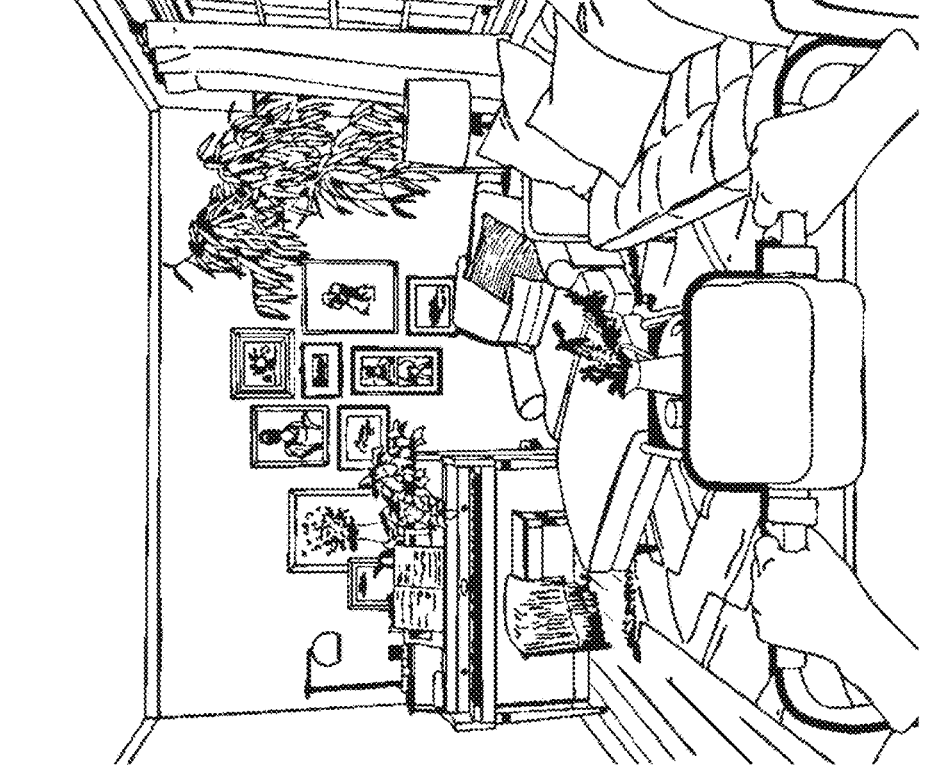
FIG. 10

Control Mode / Interact Mode
View Mode / Drive Mode
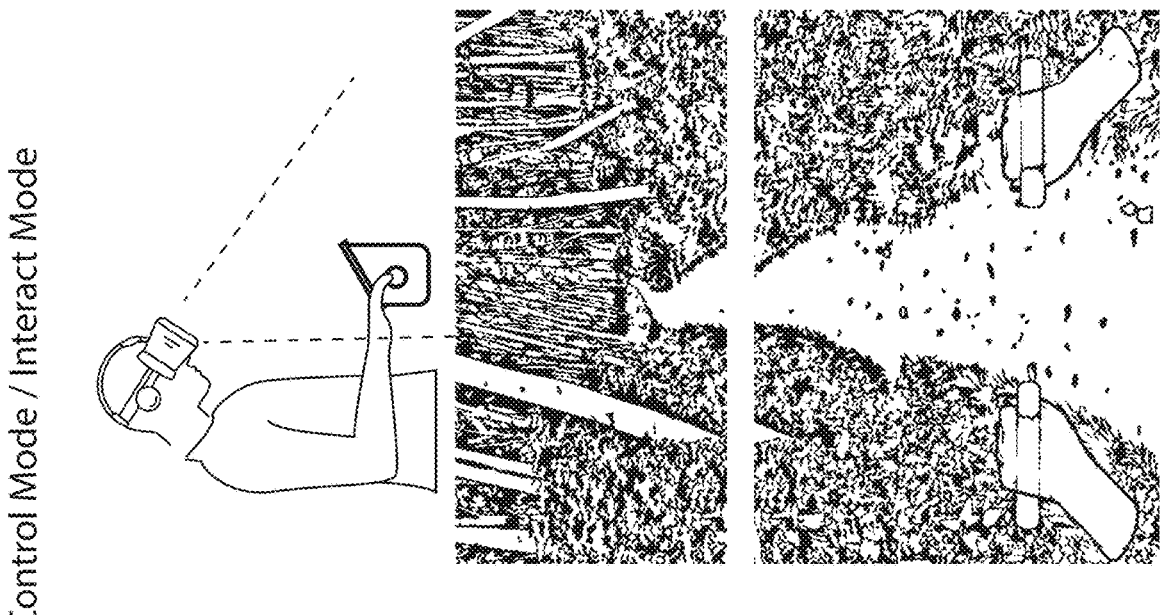
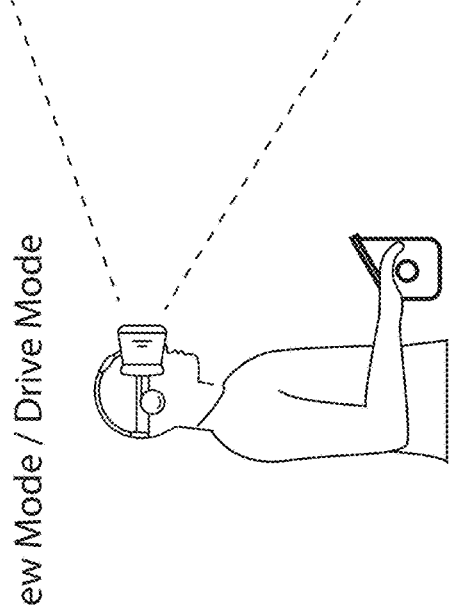
FIG. 11

| Action (Game character) | Walking | Running | Jumping | Hopping |
|---|---|---|---|---|
| Movement (Actual user) | | | | |
| Instruction | 1 Foot Alternation | 1 Foot Alternation- Fast | 2 Feet Stamp at Same Time | 1 Foot Stamp on Same Zone |
| Distance | 1 meter /Stamp | 3 meter /Stamp | 1.5 meter /Stamp | 0.5 meter /Stamp |
| Unit (Unreal engine Unit ) | 60uu | <180uu | 90uu | 30uu |

FIG. 13

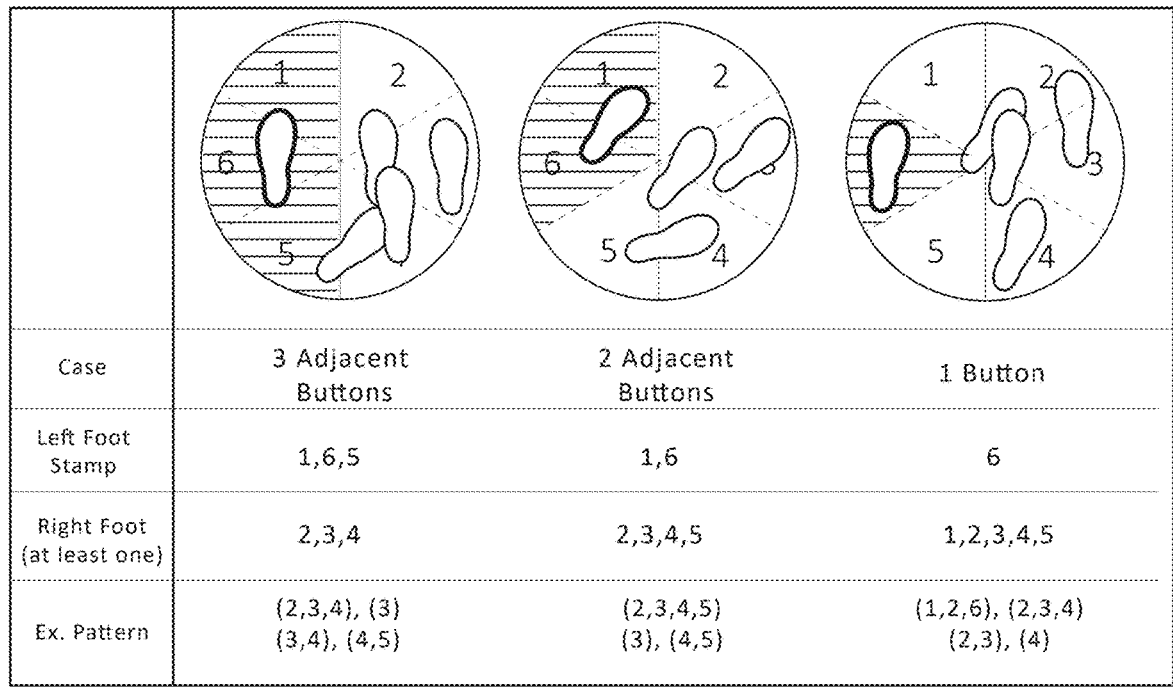

| Case | 3 Adjacent Buttons | 2 Adjacent Buttons | 1 Button |
|---|---|---|---|
| Left Foot Stamp | 1,6,5 | 1,6 | 6 |
| Right Foot (at least one) | 2,3,4 | 2,3,4,5 | 1,2,3,4,5 |
| Ex. Pattern | (2,3,4), (3) (3,4), (4,5) | (2,3,4,5) (3), (4,5) | (1,2,6), (2,3,4) (2,3), (4) |

FIG. 14

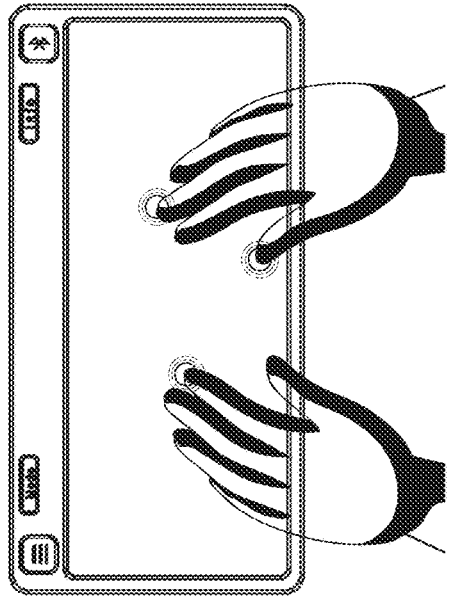
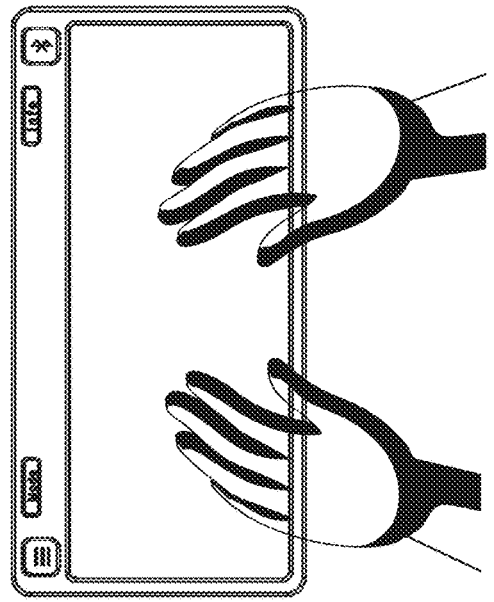
Solid Circle: Resting or Touching : x < 2 psi
Dash Circle: Pressing or Clicking : x > 2 psi
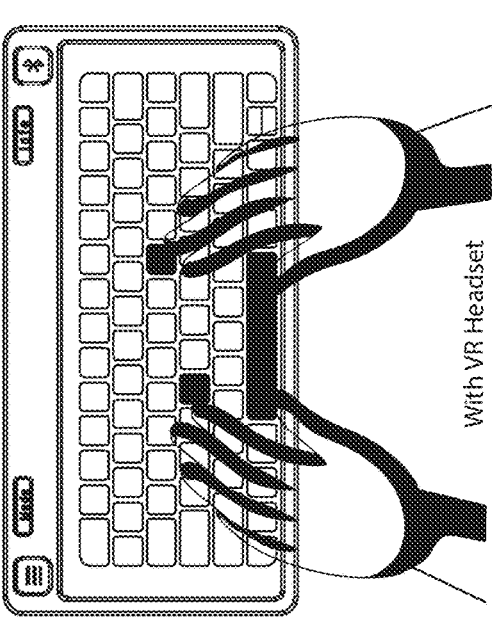
With VR Headset
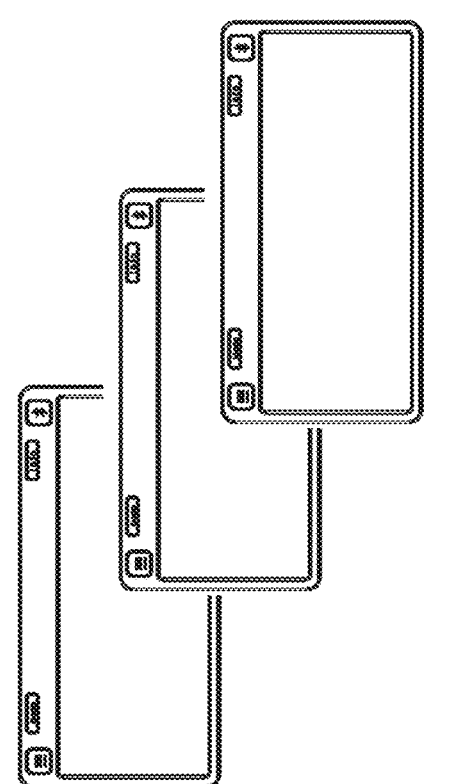
X-Pad Interactive option
FIG. 16

VR app, X-Pad UX

Choose Environment

TAKAWA
Take a Walk

Walk + Interact in Space

Interact with X-pad

FIG. 17

Workflow : VR Walk and Chat on VR trail

@Claire0123

Me: Okay, I am already walking on a trail.

Message from Claire0123

Claire0123: Hey, I will be there in 5 min.

Hey, Sorry my meeting got delayed.
How long you've been walking?

No Worry. Just a bit longer than 10 min.?

Claire0123
has joined to the trail

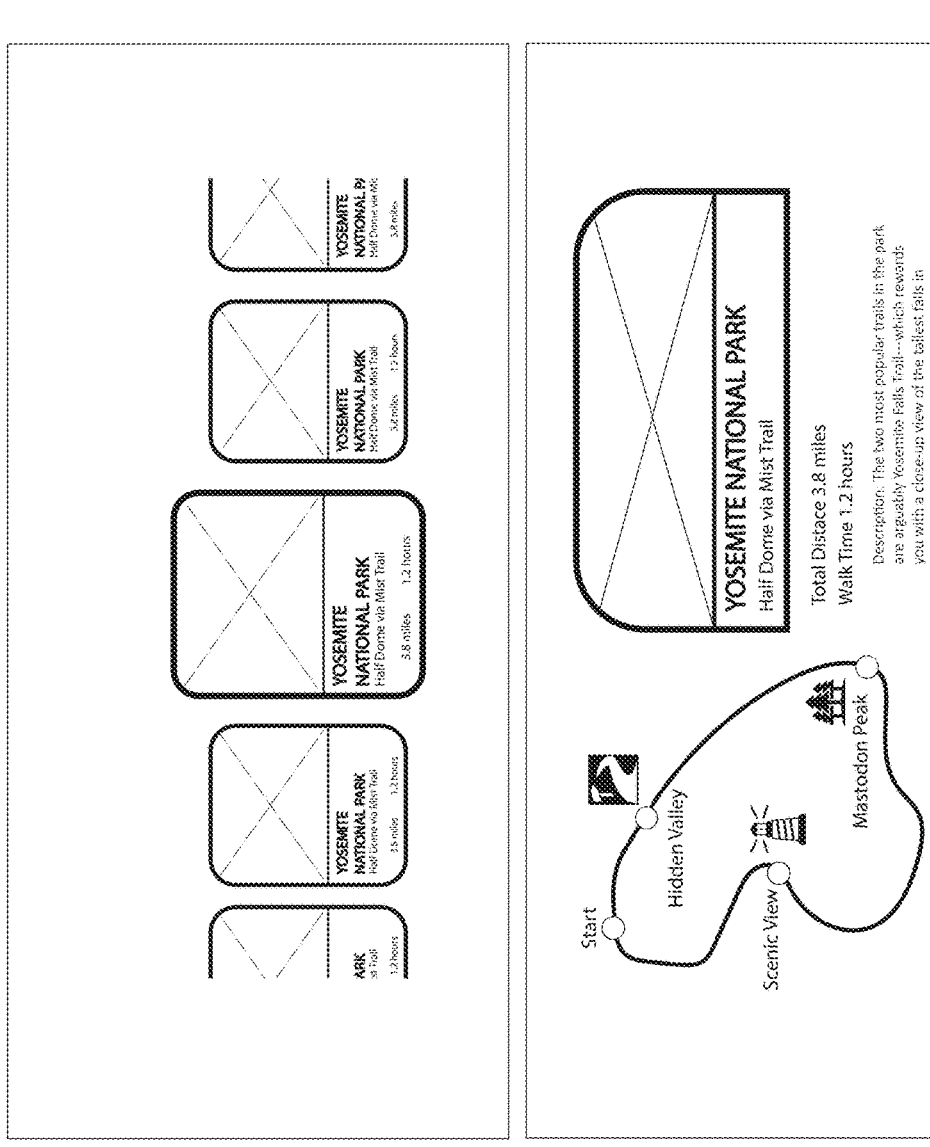
FIG. 20

VIRTUAL AND AUGMENTED REALITY SYSTEM WITH PORTABLE WALKER

CROSS-REFERENCE TO RELATED APPLICATIONS

This application claims the benefit of U.S. Provisional Patent Application No. 63/580,435, filed on Sep. 4, 2023, which is incorporated herein by reference in its entirety.

BACKGROUND

This invention relates generally to virtual reality (VR) and augmented reality (AR) systems, and more particularly to a VR and AR system coupled to a portable walker system.

Typically, current VR systems have applications and systems that allow a user to move various parts of the anatomical body to, for example, play games in the virtual environment, exercise, healthcare, and the like. For example, a VR system may have one or more physical devices (e.g., belt attachment, boots) or electronic devices that allow a user to run or walk in the actual environment, such that the user's movement in the actual environment is replicated or simulated in the virtual environment while, for example, the user is playing a shooting game. Often times, users of these VR systems end up getting injured, either by falling or bumping into objects in the actual environment because of limitations of the VR system. Moreover, in current VR environments, in order to type at a work station, one way to provide input is users point at the letters or use a combination of pointing to type using, for example, hand tracking. However, this results in a sub-optimal VR experience for users.

BRIEF DESCRIPTION OF THE DRAWINGS

FIG. 9 illustrates a user interface for the X-Pad, according to one embodiment.

FIG. 10 illustrates images showing a user's view in the actual environment (left) and the user's view in the virtual environment (right), in accordance with an embodiment.

FIG. 11 illustrates images showing a user in a view/drive mode and a control/interact mode, in accordance with an embodiment.

FIG. 13 illustrates features of the tracking pad, according to one embodiment.

FIG. 14 illustrates a functionality of the tracking pad, according to one embodiment.

FIG. 16 illustrates example user interactions on the X-Pad, according to one embodiment.

FIG. 17 illustrates an example user interface and user experience flow for a user of the Takawa application, according to one embodiment.

FIG. 20 illustrates example screenshots of user interface (UI) and user experience (UX) pages displayed by the control station assembly, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
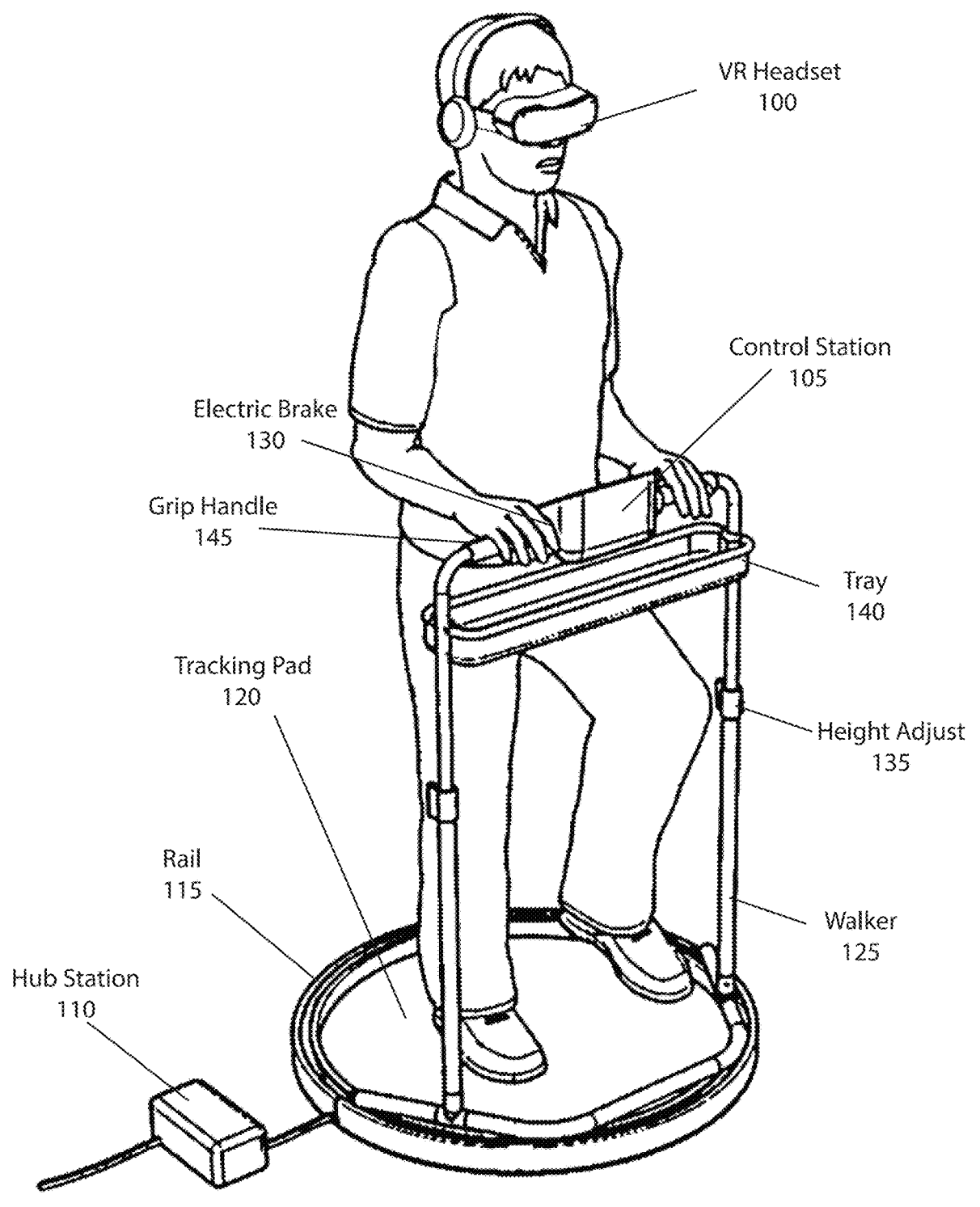
FIG. 1 is a high level block diagram of a virtual reality (VR) system coupled to a portable walker system, in accordance with an embodiment.

FIG. 1 is a high level block diagram of a virtual reality (VR) system 100 including a portable walker system, in accordance with an embodiment. The VR system 100 shown in FIG. 1 includes a walker system, a control station assembly 105, a hub station assembly 110, and a VR headset 107. In alternative configurations, different or additional components may be included in the system environment 100. In one instance, the walker system includes a rail 115, a tracking pad 120, a walker 125, an electric brake 130, a height adjust mechanism 135, a tray 140, and a grip handle 145.

Specifically, the VR system 100 allows a user to experience virtual environments and tracks the user's movement, such that the user's movement can be simulated or replicated in the virtual environment. This allows the user to have a more immersive VR experience. In one embodiment, the VR system 100 provides a walker system that allows the user to move around in a freer, safer, and more balanced manner for movement tracking compared to existing VR systems. The user may interact with the virtual environment without having to wear or handle cumbersome devices, such as hand controllers, wearables, and the like, that existing VR systems require to track user movement.

In particular, many users of existing VR systems wear a VR headset 107 that displays information but blocks most or all of the user's vision in the actual environment. The VR headset 107, when worn by the user, displays information from an application for the VR system and allows the user to be visually immersed in a virtual environment generated and displayed by the application. Certain VR systems include various physical and electronic devices that allow the system to track the user's movement, such that the user's movement can be simulated in the virtual environment. In this manner, the user can have a more immersive VR experience as the user's movement in the actual environment is also mimicked and reflected in, for example, an avatar of the user in the virtual environment. However, often times, the user ends up getting injured, falling, or bumping into objects in the actual environment because of the limitations of these devices.

For example, a VR system may have one or more hand controllers that the user holds during the VR experience to track movement of the user's hands and arms, or footwear such as boots that include sensors or tracking the user's foot movement. However, it is cumbersome for the user to hold these controllers or wear boots while moving and can result in injury. In another example, a VR system may include wearables that have tracking sensors attached to cloth, shoes, or the knee areas to track the user's movement via the attached sensors. However, it is also cumbersome for the user to have to put on wearables every time the user would like to experience the virtual environment. In yet another example, a VR system includes a wearable belt attachment that the user can use to tie one end to the waist and the other end to an anchor bar in the actual environment, such that the user is relatively free to move but is prevented from moving beyond a certain boundary for safety issues. However, this setup also requires a relatively bulky and cumbersome setup. Therefore, the VR system 100 described herein allows a user to experience virtual environments and the user's movements to be replicated or simulated in a simplified manner that allows the user to move about more freely in a balanced and safe manner compared to existing VR systems.

In one embodiment, the VR headset 107 includes a system including one or more computer processors and a non-transitory computer-readable medium and that is installed with an application. For example, the system may be configured with an operating system and the application for the operating system may be installed. The user via the application installed on VR headset 107 is able to immerse in VR experiences, such as virtual hikes or virtual walks within a VR environment. The VR system 100 is also able to replicate the user's movement in the virtual environment using the walker system, as described in more detail below. For example, the tracking pad 120 tracks when a user takes a "step" of a walk or run. As another example, the control station assembly 105 includes rotational sensors like inertial measurement unit (IMU) sensors, gyroscope sensors, or MEMS-based sensors that detect any rotational direction of the walker system by the user. The tracking information is sent to the online system in communication with the application via, for example, the VR headset 107. Based on the tracking information, the online system is able to replicate the user's movement into the virtual environment by changing the video/image stream displayed on the VR headset 107 to alter the user's point-of-view.

In one instance, the control station assembly 105 includes one or more emitting devices (e.g., infrared light emitting diode (LED) devices) disposed around the periphery of the control station assembly 105. When the user moves the VR headset 107 to face the control station assembly 105, the one or more optical sensors in the VR headset 107 can detect the location of the emitting devices and therefore, the shape of the control station assembly 105. The application receives location information and can generate a user interface (UI) element on the display that replicates the shape of the control station assembly 105.

In one embodiment, the user can use various input mechanisms (e.g., recessed keyboard, mouse,) configured on the control station assembly 105 to input data (e.g., type text, draw). The input data is provided to the VR headset 107 as the user enters the input and displayed to the user. For example, the user may choose a keyboard input mode, and as the user types certain keys on the recessed keyboard of the control station 105, the input may be reflected on the screen (e.g., letters being typed, input being entered) of the VR headset 107. A more detailed description on how the input is provided is described in detail with respect to the X-Pad below.

Figure 2:
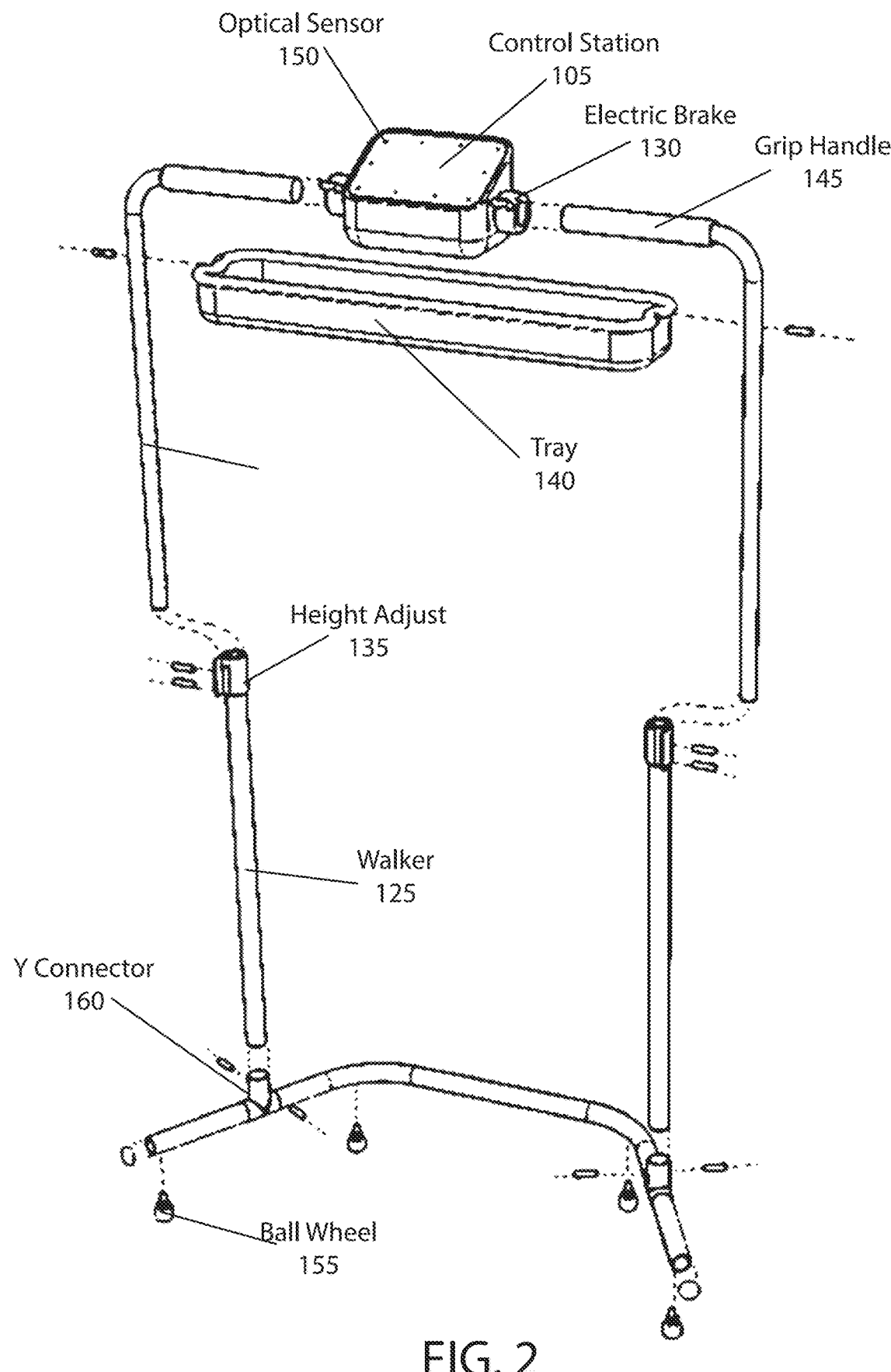
FIG. 2 illustrates components of an example walker system, in accordance with an embodiment.

FIG. 2 illustrates components of an example walker system, in accordance with an embodiment. In one embodiment, the walker system includes a walker 125, one or more electric brakes 130, one or more height adjusts 135, a tray 140, a grip handle 145. In one embodiment, the walker system is integrated or connected with the control station assembly 105. The bottom of the walker 125 is attached to one or more wheels that allow the user to move the walker 125 around in conjunction with the rail 115. Moreover, depending on the height of the user, the user can adjust the height using the height adjusts 135, such that the user's hand or arm comfortably sits on the grip handle 145.

Figure 3:
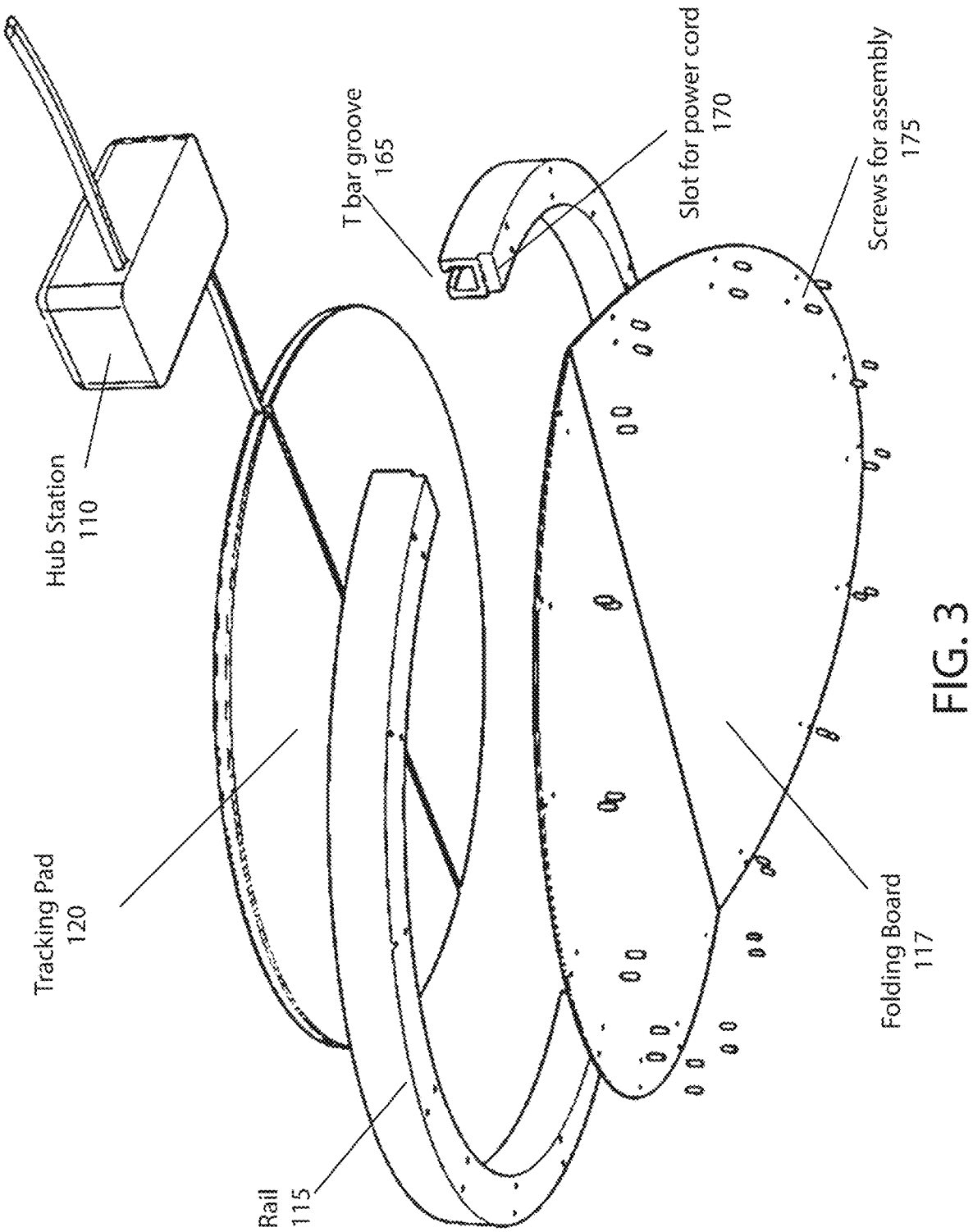
FIG. 3 is a block diagram of an architecture of a tracking pad assembly and hub station assembly, in accordance with an embodiment.

FIG. 3 is a block diagram of an architecture of a tracking pad assembly and hub station assembly, in accordance with an embodiment. In one embodiment, the tracking pad assembly includes a tracking pad 120, a rail 115, and a folding board 117. In one embodiment, the tracking pad assembly and more specifically, the tracking pad 120, is electrically connected to the hub station assembly 110. In one instance, the tracking pad 120 is formed of copper and/or Velostat, and is composed of one or more sensors that detect when a user standing on the tracking pad 120 has taken a step (e.g., walking step, running step, jogging step). In one instance, the sensor(s) in the tracking pad 120 are pressure sensors (e.g., detect pressure when user takes a step), touch sensors (e.g., detect touch when user takes a step), and the like. However, it is appreciated that in other embodiments, the tracking pad 120 may be composed of sensors that are configured to detect whenever a user has taken a step (or eitherwise moved on the tracking pad 120).

Figure 4:
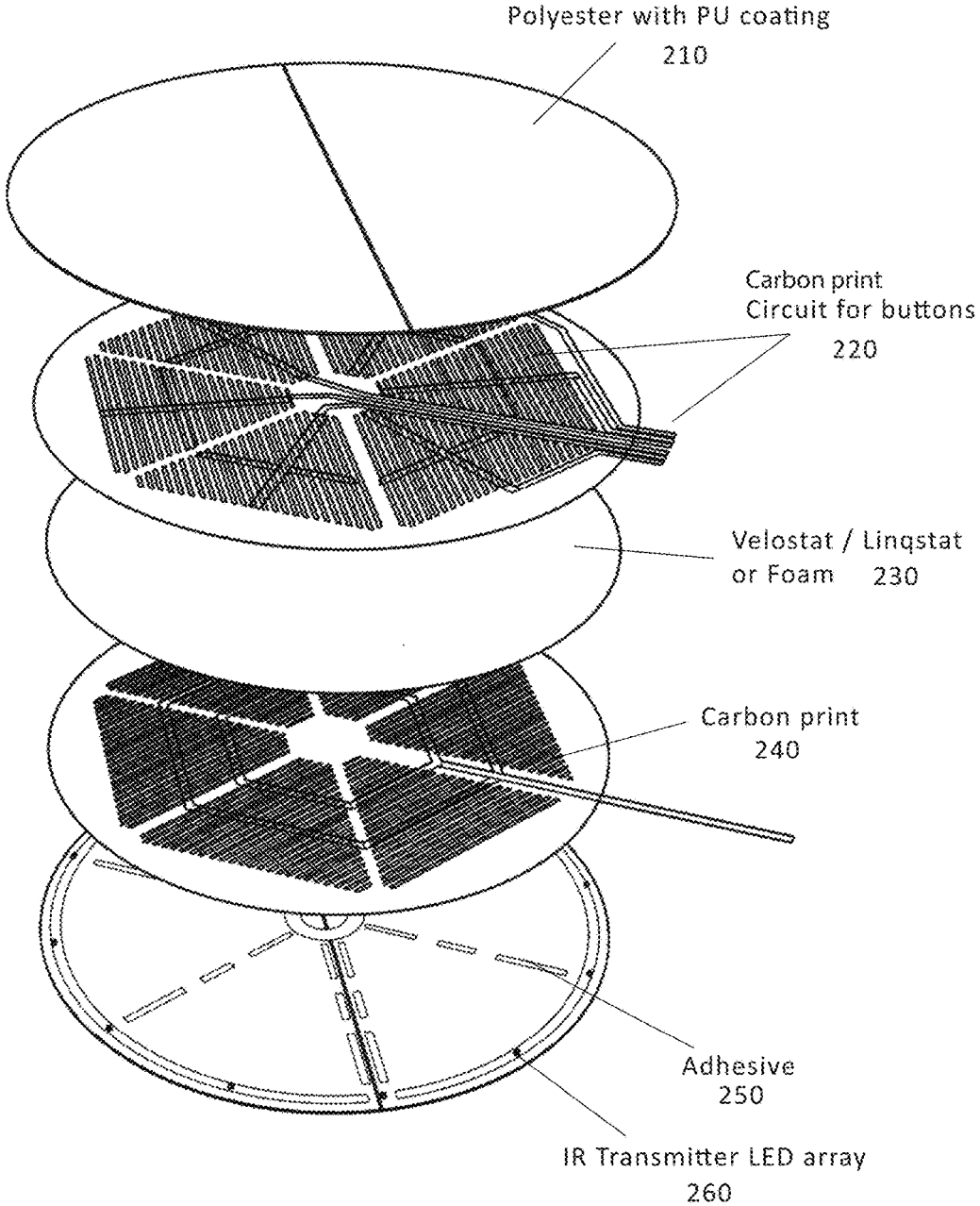
FIG. 4 illustrates components of a tracking pad 120, in accordance with an embodiment.

FIG. 4 illustrates components of a tracking pad 120, in accordance with an embodiment. In one embodiment, the tracking pad 120 is constructed with five layers. In one embodiment, at least a part of the top layer 210 and the bottom layer are made of polyester with a polyurethane (PU) coating and heat adhesive, providing both hygiene and liquid-proof protection. Beneath the top layer 210 lies a conductive print layer 220 and above the bottom layer is another carbon print layer 240. In between the conductive layers is one or more sheets of resistance material 230, such as Velostat, Linqstat, or perforated foam, which are known for their conductive resistance properties. This material plays a crucial role in detecting pressure changes when the user steps on the tracking pad 120. In one embodiment, the carbon print layers 220, 240 feature carbon prints that form six distinct buttons for detecting user input. Due to electrical property changes (e.g., capacitance changes) when the user steps on the pad, the carbon print layers 220 and 240 and the resistance material layer 230 together form sensors to detect user movement on the tracking pad 120. For example, the tracking pad 120 when applied pressure to at a particular location may trigger capacitance change at that location, and the location of that position may be provided to the application via hub station. In one embodiment, the bottom layer also houses an array of infrared (IR) transmitter LEDs 260, which make the walking pad visible within the VR environment.

Figure 5:
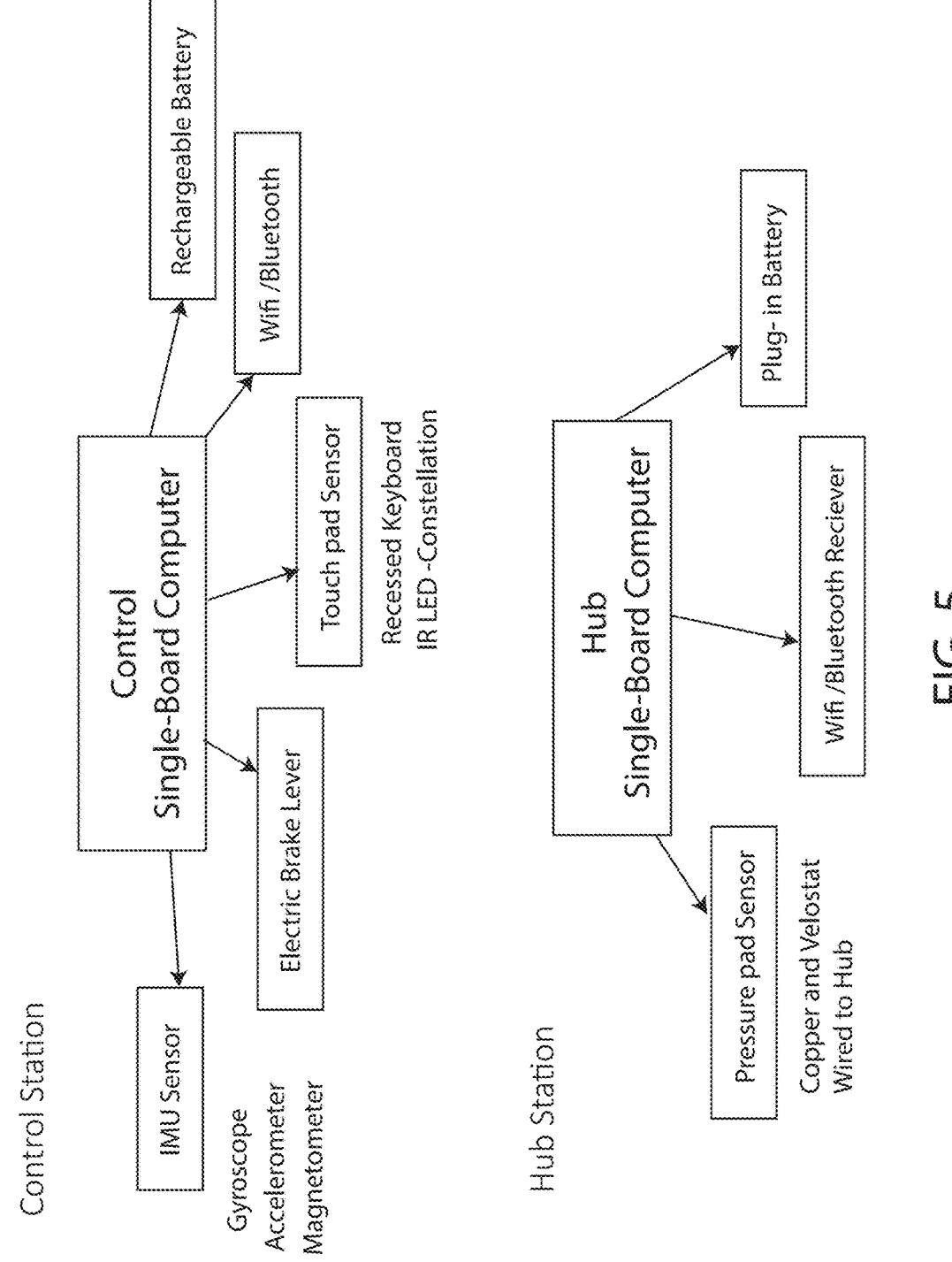
FIG. 5 is a block diagram illustrating components of a control station and a hub station, in accordance with an embodiment.

FIG. 5 is a block diagram illustrating components of a control station assembly 105 and a hub station assembly 110, in accordance with an embodiment. As illustrated in FIG. 4, in one embodiment, the control station assembly 105 includes a control computer (e.g., control single board computer), one or more rotational sensors (e.g., inertia measurement (IMU) sensors), one or more electric brake levers, touch pad sensor, a WiFi/Bluetooth connector, and/or a rechargeable battery. The IMU sensors include sensors that detect inertia and change in movement and may include, for example, gyroscope(s) or IMU sensors that detect rotation, accelerometer(s) that detect acceleration, magnetometer(s) that detect changes in magnetic fields. The electric brake lever when pressed by the user provides a signal to the control computer that the lever has been pressed. In one instance, the electric brake lever(s) is positioned on both a left side and a right side of the walker system.

In one embodiment, the hub station assembly 110 includes a hub computer (e.g., hub single board computer), one or more pad sensors (e.g., pressure pad sensors, touch pad sensors), a WiFi/Bluetooth connector, and/or a plug-in battery. The pad sensors include sensors that detect a user's movement, specifically a user's step (e.g., walking step, running step), and may include, for example, pressure sensors or touch sensors. In one instance, the hub station assembly 110 is powered by a plug-in mechanism to an electrical outlet or may be powered by a plug-in battery.

Figure 6:
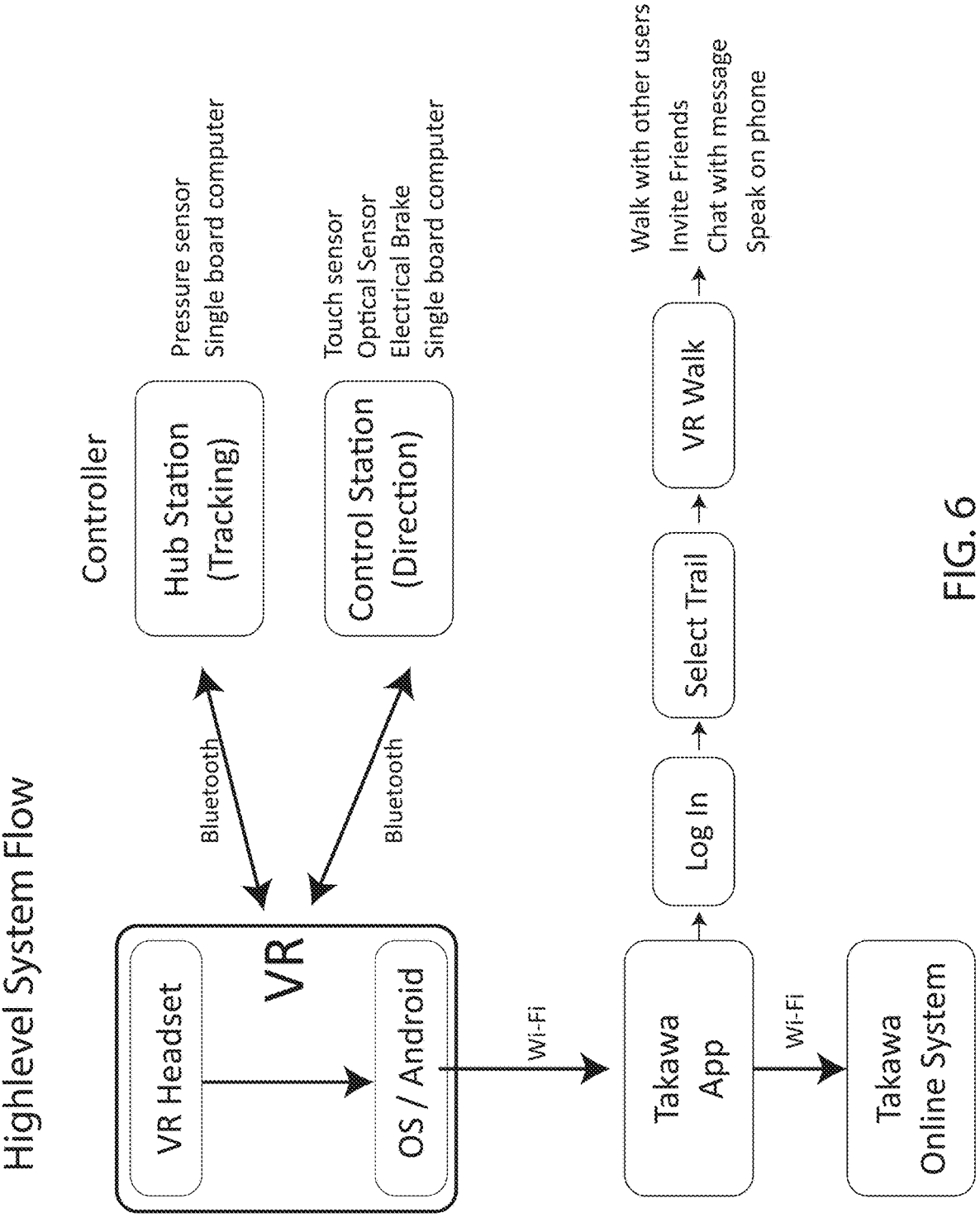
FIG. 6 illustrates a high-level system flow of using the VR system by a user, in accordance with an embodiment.

FIG. 6 illustrates a high-level system flow of using the VR system 150, in accordance with an embodiment. The VR headset 107 may be installed with an application ("Takawa Application") that provides virtual experiences and allows users to share these virtual experiences with other users. The application may be in communication with an online system that is managed by an entity responsible for the application. The user may log in to the user's account on the application, select a virtual experience, as well as perform other actions, such as invite other users, chat with other users via messaging, speak on the phone, and the like. In the example shown in FIG. 6, the user logs in and selects a trail for a virtual walk. The user can invite other users on the walk, chat with other users via messaging, and speak on the phone with other users.

As described in conjunction with FIG. 1, the hub station assembly 110 receives tracking information (e.g., when user steps on the tracking pad 120) and provides the tracking information to the VR headset 107 via, for example, Bluetooth or WiFi. The control station assembly 105, specifically, the control computer receives a signal of the user's direction (e.g., direction where user is moving the walking system) and provides the direction information to the VR headset 107 via, for example, Bluetooth or WiFi. Moreover, when the user uses the touch pad sensor to input data (e.g., recessed keyboard, mouse, joystick), the input information may also be received by the control computer and provided to the VR headset 107 via, for example, Bluetooth or WiFi.

As shown in FIG. 6, the tracking information, input information, and direction information is obtained by the Bluetooth or WiFi receiver of the VR headset 107 and provided to the application ("Takawa Application" shown in FIG. 6). Thus, as the user is experiencing the VR walk, the application may detect the user's movements as the user steps, rotates direction, or other types of movements made by the user. The application may provide this information to the online system and the online system may alter the video or image stream that the user experiences to reflect the user's movements as if the user was actually walking in such an environment.

Figure 7:
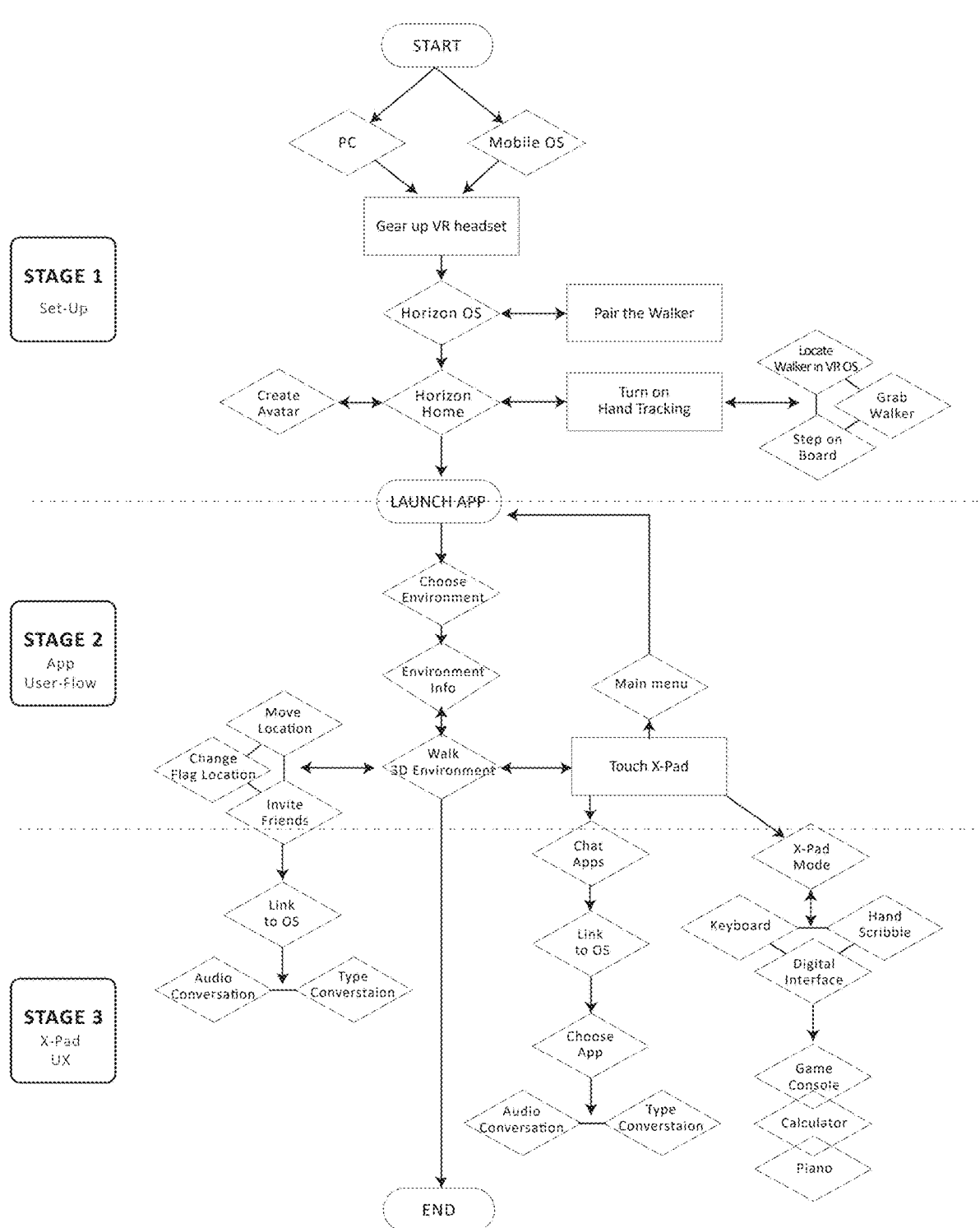
FIG. 7 illustrates a flow for using the VR system, according to an embodiment.

FIG. 7 illustrates a flow for using the VR system 100, according to an embodiment. Specifically, the flow describes at least three stages, the set-up stage ("Stage 1"), the application user flow stage ("Stage 2"), and the X-Pad UX stage ("Stage 3"). The Stage-1 outlines the process for setting up the "VR Walker" hardware with the VR platform 100. The Takawa application can be launched from either a personal computer or a mobile operating system such as iOS or Android. The user begins by gearing up a VR headset 107, which can be any brand compatible with, for example, Meta Horizon Worlds. After logging into Horizon OS, the user pairs the VR Walker system (e.g., walker system described in FIG. 2) with the VR headset 107 via a communication protocol such as Bluetooth LE. In the Horizon home space, the user needs to create an avatar and enable the hand tracking feature in the settings. Once hand tracking is activated, the hand controllers are no longer necessary and should be stored safely. If the VR Walker is successfully paired with Horizon OS, it will appear in the VR scene as a controller. The user can then step onto the tracking pad 120 and grasp the handle 145 to navigate 3D environments with full-body movement.

Stage-2 describes the interactive process within the Takawa application. Upon launching the application, the user selects a 3D virtual environment. The first screen displays detailed information about the chosen environment. After reviewing this information, the user directly enters the 3D virtual environment. Within this virtual space, the user can explore and interact with various elements, including scenes, people, sounds, and motion. The walking settings allow the user to change their current location to a different flagged spot or invite friends to join them. Additionally, the user can switch to a different environment or save their current location for future reference.

Stage 3 delves into the functionality of the X-Pad user interface, which is described in further detail below. As the user walks (e.g., by stepping on the tracking pad 120), a semi-transparent X-Pad board hovers in the air in the virtual environment. When the user taps it, the X-Pad transitions into an active mode, where the transparency decreases, making it more solid and fully interactive. In one embodiment, the X-Pad features four sensor buttons—Main, Mode, Info, and Bluetooth—and one pressure-sensitive sensor board. The Main button takes the user to the Horizon OS main page. The Mode button reveals additional interface options, such as a keyboard, hand scribble, game console, calculator, DJ mixer, and the like. The Info button shows details about the current application and any linked chat applications, allowing you to easily communicate with friends through the OS.

Figure 8:
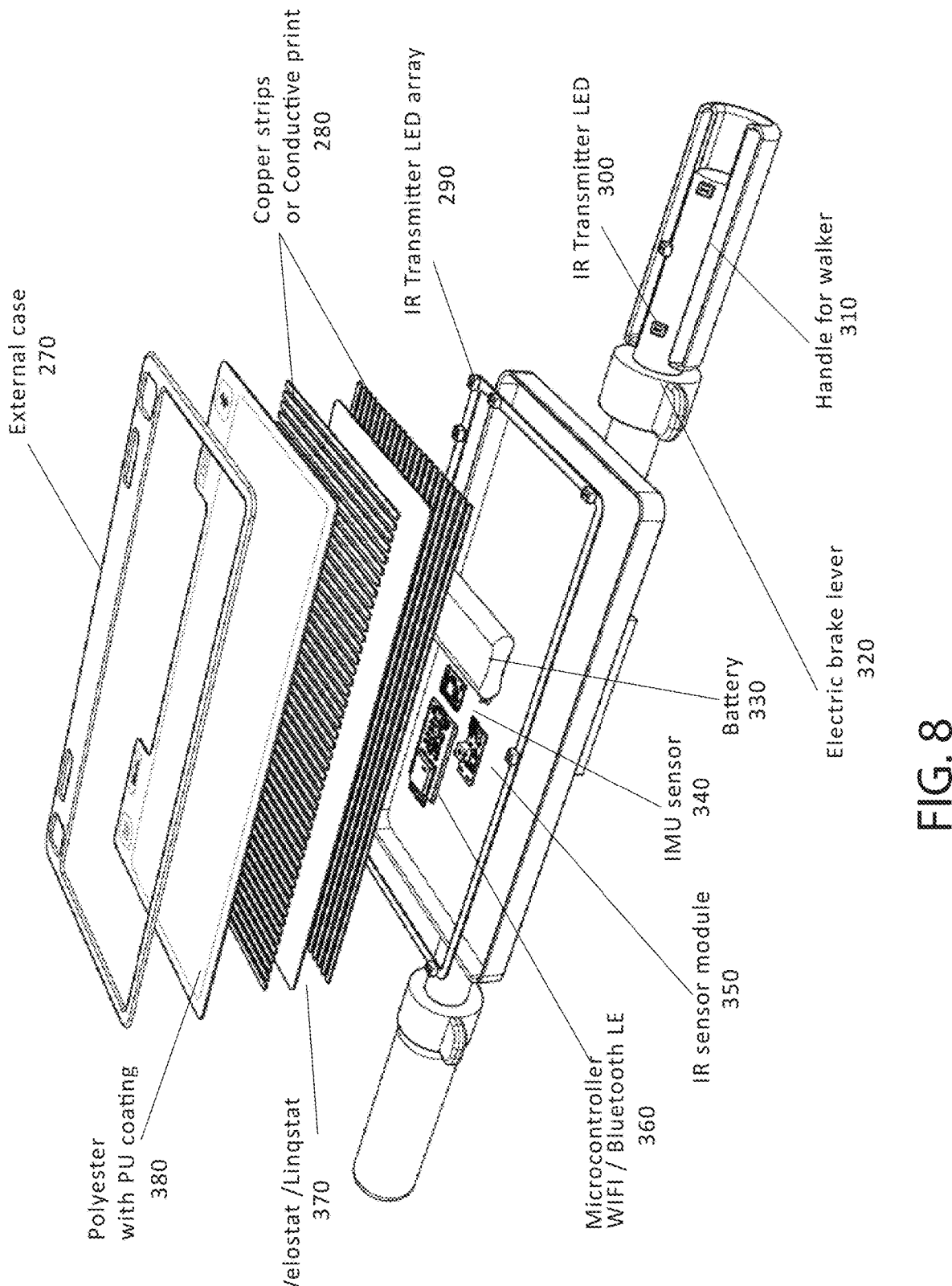
FIG. 8 illustrates components of an X-Pad system, according to an embodiment.

FIG. 8 illustrates components of an X-Pad system, according to an embodiment. In one embodiment, the X-Pad is a pressure-sensitive, or interactive surface, hardware device that displays multiple user interfaces, which are visible within the VR environment. In one embodiment, the X-Pad encompasses the control station 105, the optical sensors 150, electric brake 130, and the grip handle 145 described with respect to the walker system of FIG. 2. The grid conductive allows for detailed pressure mapping, showing exactly where and how much force is being applied.

In one embodiment, the X-Pad is composed of several key components. In one instance, the X-Pad includes a microcontroller 360 that handles Wi-Fi and Bluetooth LE connectivity, as well as the operating system responsible for walking control. In one instance, the X-Pad includes an IMU sensor 340 that detects direction and rotational speed, enabling accurate movement tracking in the VR environment. In one instance, the X-Pad includes an IR sensor module 340 and an IR Transmitter LED array 290 that are strategically placed on the controller to ensure optimal tracking accuracy within the VR setting. In one instance, the X-Pad includes the grab handle 310 with integrated IR transmitter LEDs 300 to detect movement and location within the virtual environment. In one instance, the X-Pad includes an electric brake lever 320 tethered on both sides of the handle. The electric brake lever 320 is connected to the microcontroller 360 on the main board, allowing precise control over stopping and starting movements. In one embodiment, the user may imitate stopping movement in the virtual environment by rotating the handle 310 for the walker system toward the user.

The external plastic case 270 is placed over the assembled components and screwed onto the bottom case. Copper strips or conductive patterns 280, spaced about 5 mm apart, are added to improve accuracy. These strips are layered with Velostat or Linqstat to create a pressure-sensitive interface. The interactive surface is composed of a polyester with a polyurethane (PU) coating 380 offering both user touch sensitivity and enhanced protection against liquids and contaminants. The heat-activated adhesive ensures a secure bond, while the inherent flexibility of the fabric allows for effective pressure tolerance and durability in interactive applications.

FIG. 9 illustrates a user interface for the X-Pad, according to one embodiment. In one embodiment, instructions for generating the UI illustrated in FIG. 9 is provided by the Takawa application to the X-Pad device when the X-Pad device is turned on. In another embodiment, the UI illustrated in FIG. 9 is configured as physical hardware buttons. In one embodiment, the X-Pad features four buttons. In one instance, the UI displays a main button that allows the user to navigate to the Horizon OS main page. In one instance, the UI displays a mode button that displays additional input interface options, such as a touch keyboard, hand scribble pad, game console, calculator, and the like. In one instance, the UI displays an info button that allows the application to show details about the current application and current application settings, and linked applications like chat, note, sketches, and the like. In one instance, the UI displays a Bluetooth button for managing connections for pairing with other devices. In one instance, the UI displays a pressure-sensitive mat that functions as both pressure sensitive touch buttons in the VR setting, with a graphical interface that varies based on the interaction.

In one embodiment, the overall dimensions of the X-Pad are 12.5 inches in width, 7 inches in height, and approximately 1.5 inches in depth. The pressure-sensitive sensor screen measures 11 inches by 4.5 inches and is positioned slightly lower within the device. The top section accommodates space for four buttons. An IR LED array is integrated around the perimeter of the 11×4.5 inch screen, which is visible only through a VR headset 107. The four corner IR LEDs are used to detect the screen's location within a virtual environment, enabling the user interface graphics to be displayed in the corresponding four corner areas of the virtual space.

FIG. 10 illustrates images showing a user's view in the actual environment (left) and the user's view in the virtual environment (right), in accordance with an embodiment. The left illustrates the user in the user's home and the right illustrates the virtual environment of a virtual hike. The virtual hike is shown when the user has put on the VR headset 107 and selects the virtual hike via the application. As the user takes a step on the tracking pad 120, the virtual environment may change (e.g., altered by stream provided to application by online system) such that the user will see an environment as if the user moved approximately one step forward. Moreover, when the user changes direction 20 degrees to the left using the walker system, the virtual environment may change such that the user will see an environment as if the user rotated 20 degrees to the left from their current position.

FIG. 11 illustrates images showing a user in a view/drive mode and a control/interact mode, in accordance with an embodiment. The left shows a view mode or drive mode, in which the user is actively interacting with a virtual environment. When the user wants to interact with the control station assembly 105, the user may look down at where the control station assembly 105 is. Because the control station assembly 105 has optical sensors (e.g., IR LED sensors) around the periphery of the display, the VR headset 107 detects the periphery of the display and this information is sent to the application. In one instance, the optical sensors can be any type of sensors that can be detected and recognized by the VR headset 107. Thus, a UI interface that reflects the shape and outline of the control station assembly 105 is generated on the application UI when the user looks down at the control station assembly 105.

Figure 12:
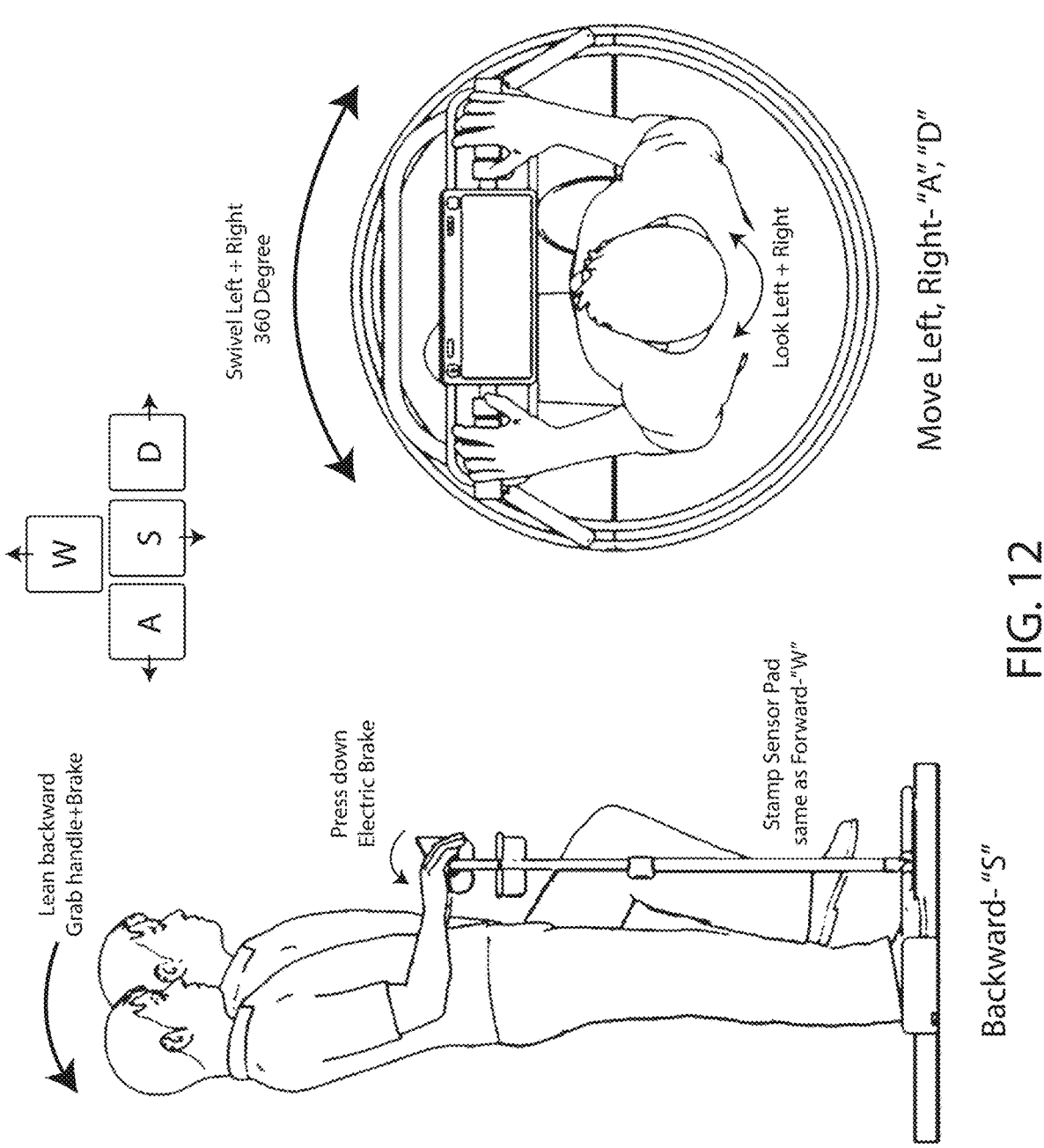
FIG. 12 illustrates a maneuver using the walker system described herein, in accordance with an embodiment.

FIG. 12 illustrates a maneuver using the walker system described herein, in accordance with an embodiment. As an example, in a typical PC game, character movement is controlled using the "WSAD" keys on a keyboard. In one embodiment, with the walker system (also known as "Fancy-Walker"), a character in the virtual environment can move forward (equivalent to pressing "W" in a game) by taking one or more steps on the tracking pad. To move backward (equivalent to "S"), the user steps on the tracking pad while simultaneously pressing the electric brake on the handle, causing the torso to naturally lean back slightly. Turning left or right (equivalent to "A" and "D") is achieved by swiveling the walker, which activates the gyroscope or IMU sensors and accelerometer sensors to detect the direction. The rail and wheels on the walker system ensure the user remains stationary in the physical space while navigating the virtual environment. However, it is appreciated that in other embodiments, any other type of configuration can be configured to simulate these movements by the user.

FIG. 13 illustrates features of the tracking pad 120, according to one embodiment. In one embodiment, the Fancy-Walker walker system offers four different walking modes, each influencing the speed and distance traveled in the virtual environment. In one instance, in the "regular walking" mode, each step on the tracking pad 120 moves the character in the virtual environment approximately 1 meter per step in the virtual world, which equates to about 60 Unreal Engine Units (uu), the standard unit for character speed in Unreal Engine. In one instance, the "fast walking" mode is triggered when the user steps more quickly, causing the character's movement speed to increase proportionally (e.g., linearly proportional). Depending on the pace, this mode can accelerate the character's movement to roughly 3 meters per step, or about 180 uu. In one instance, the "jumping" mode is triggered when the user steps on the pad with both feet simultaneously. This action triggers a jump of the character in the virtual environment. In one instance, the "hopping" mode is triggered when the user consistently steps on the same area of the pad, the user activates a hopping motion, maintaining consistent movement without significantly advancing in distance. Each walking mode allows for varying degrees of immersion and control within the virtual environment, adapting to the user's movement style. It is appreciated that in other embodiments, the VR system 100 described herein may further include other modes of action to simulate various types of movement within the virtual environment.

FIG. 14 illustrates a functionality of the tracking pad 120, according to one embodiment. In one embodiment, as also indicated in FIG. 2, the tracking pad 120 is divided into six buttons or regions (regions 1, 2, 3, 4, 5, 6), allowing the user to step on up to three adjacent buttons simultaneously. In one embodiment, to move the character in one or more of the action modes discussed in conjunction with FIG. 12, the user has to step on buttons that were not activated during the previous step. As an example, when the user's left foot stepped on regions 1, 5, 6 of the tracking pad 120, the next step (e.g., with user's right foot) should land on at least one or a combination of regions 2, 3, 4. As another example, when the user's left foot stepped on regions 1, 6 of the tracking pad 120, the next step (e.g., with user's right foot) should land on at least one or a combination of 2, 3, 4, 5. As yet another example, when the user's left foot stepped on region 6, the next step should land on at least one or a combination of 1, 2, 3, 4, 5. This ensures that different buttons or regions are triggered with each step. This design enables precise control over the character's movement in the virtual environment, and ensures coordinated foot placement to navigate effectively.

Figure 15:
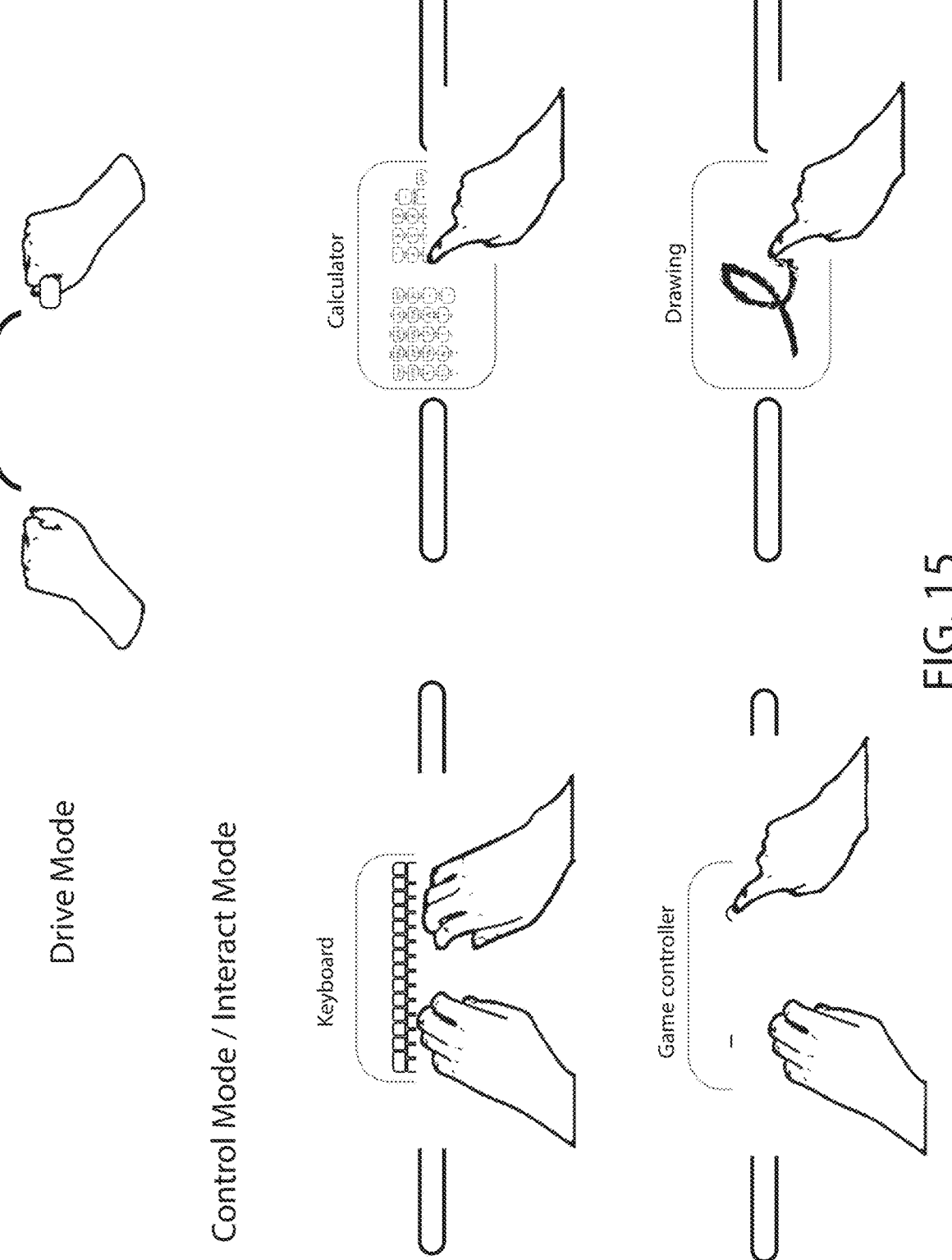
FIG. 15 illustrates images showing the control station assembly in a virtual environment in both a drive mode and a control/interact mode, in accordance with an embodiment.

FIG. 15 illustrates images showing the UI element reflecting the control station assembly 105, in accordance with an embodiment. In one instance, when in an interact mode, a keyboard interface can be displayed on the display of the VR headset 107, and the user is able to input data using a recessed keyboard configured on the control station assembly 105. In another instance, a calculator interface can be displayed on the display of the VR headset 107, and the user is able to input data using the calculator configured on the control station assembly 105. In yet another instance, a game controller interface can be displayed on the display of the VR headset 107, and the user is able to input data using the game controller buttons configured on the control station assembly 105. In yet another instance, a drawing pad interface can be displayed on the display of the VR headset 107, and the user is able to input data using a tracking or drawing pad configured on the control station assembly 105. Since the periphery and shape of the control station assembly 105 is known due to the optical sensors, the location of keyboard keys and inputs with respect to the area of the control station assembly 105 can be reflected on the display of the VR headset 107 as well.

FIG. 16 illustrates example user interactions on the X-Pad, according to one embodiment. In one embodiment, the user in reality reacts with a simple blackboard but in the virtual environment, this interaction is transformed into a complex graphical UI that moves within a defined rectangular area. The positional placement of the UI is tracked by the IR LED array 290, ensuring precise alignment. The restricted area is made from hard materials, enhancing tactile feedback and physical touch, which increases user satisfaction and accuracy. As shown in FIG. 16, the user without the VR headset 107 will not see the graphical interface, but the user with the VR headset 107 will be presented with, for example, a keyboard interface that is presented within the boundary of the IR LED array 290 of X-Pad. The user can apply pressure in areas of the blackboard that correspond to corresponding positions within the graphical interface. For example, the user can press areas on the blackboard that correspond to where the key "A" is on the keyboard to trigger entry of the character "A." In one instance, pressure less than 2 psi will not trigger the click, but applying pressure more than 2 psi will trigger the click and show up on VR settings. As another example, when wearing the VR headset 107, a graphical user interface will appear on the screen. The "P" button is situated 2⅝ inches from the left edge and 1⅞ inches from the top edge of the screen. The pressure-sensitive area for this button has a diameter of ¾ inch, centered on the specified location. When the user presses "P" in the virtual environment, the user is physically pressing a corresponding location on the pressure-sensitive pad. If you apply a pressure greater than 2 psi within this ¾-inch diameter area, the operating system will register the input as the letter "P."

Figure 17:
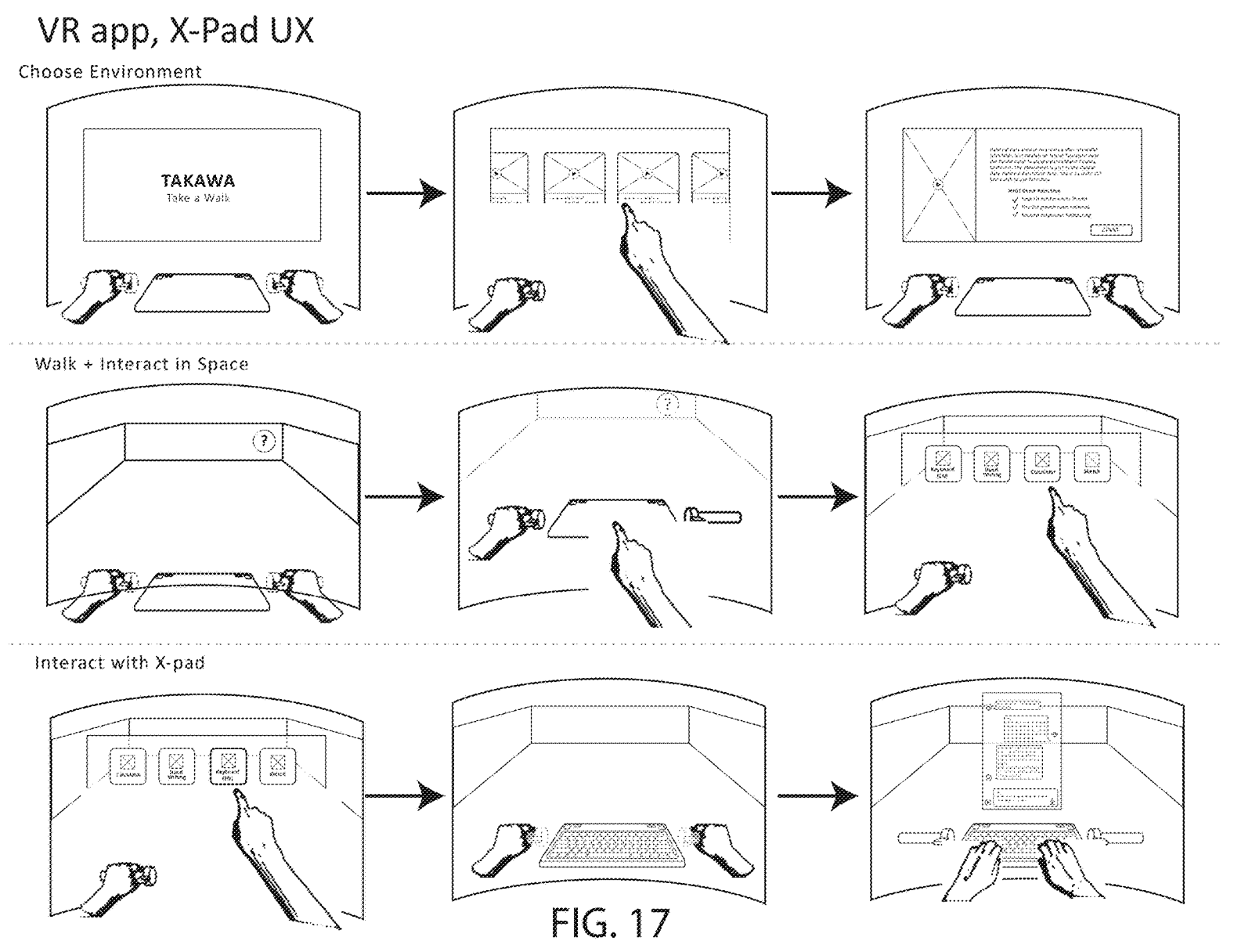

FIG. 17 illustrates an example user interface and user experience flow for a user of the Takawa application, according to one embodiment. In one instance, when the user launches the Takawa application within the VR system, the first screen the user encounters is the 3D environment options page. The user can swipe (e.g., left or right) to browse through different environments and select an environment. For example, one example environment is simulating the user in a forest; another example environment is simulating the user in a library. The next page provides detailed information about your chosen environment, along with a few recommended spots to explore. The interface may also present a start button to begin the walk. As the user walks (e.g., via stepping on the tracking pad 120), the user will notice a couple of icons and avatars appearing in different locations throughout the environment.

In one instance, once the user grabs the handles, the handle enters ghosted mode and may not be visible to the user when the user wears the VR headset 107. Moreover, the X-Pad enters the ghosted mode when it is not use for a predetermined time frame, and may not be visible to the user when the user wears the VR headset 107. When the user currently interacts with the X-Pad, it shows outlines so the user can track it. Once the user taps on it, it activates and becomes a solid color on the interface. In this way, the user more clearly sees where the button and pad is located. If the user touches the buttons on the X-Pad, it pops up a screen interface in VR space and the user can interact with the UI using regular hand motion.

In one instance, the mode button on the X-Pad activates a screen in the VR space that presents several options in an interactive UI. For example, when the user selects the keyboard mode, the VR system 100 will recognize the boundaries of the X-Pad through the IR sensors, and an interface corresponding to the locations of the IR sensors is generated. Since the boundaries are tracked, an interface is generated within that boundary through, for example, the application. For example, a keyboard layout will appear within a defined area on the pad. The user can type by interacting with the pressure-sensitive surface while resting their hands on the X-Pad. For example, the interface may show a keyboard and when the user wants to type the letter "P," the user can type on the corresponding physical location on the X-Pad as if a physical "P" button was actually disposed on the X-Pad. Simply resting on the X-Pad with minimal pressure won't trigger any input, but pressing a specific area with a bit more force will type the corresponding letter or character on the keyboard.

Figure 18:
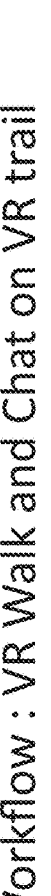
FIG. 18 illustrates example screenshots of a scenario where a user is attempting to meet with another user to take a virtual hike in the virtual environment, in accordance with an embodiment.

FIG. 18 illustrates an example workflow for a VR walk and chat on a VR trail, in accordance with an embodiment. In the first scene, the user has previously invited a user "Claire0123" to join a virtual hike. The other user chats "Hey, I will be there in 5 min." The user replies back "Okay. I am already walking on a trail." The interface shows that the other user has joined the virtual experience (the virtual trail). The last interface shows the other user talking "Hey, Sorry my meeting got delayed. How long you've been walking?" with the user's avatar or visual appearance on the display of the VR headset 107.

Figure 19:
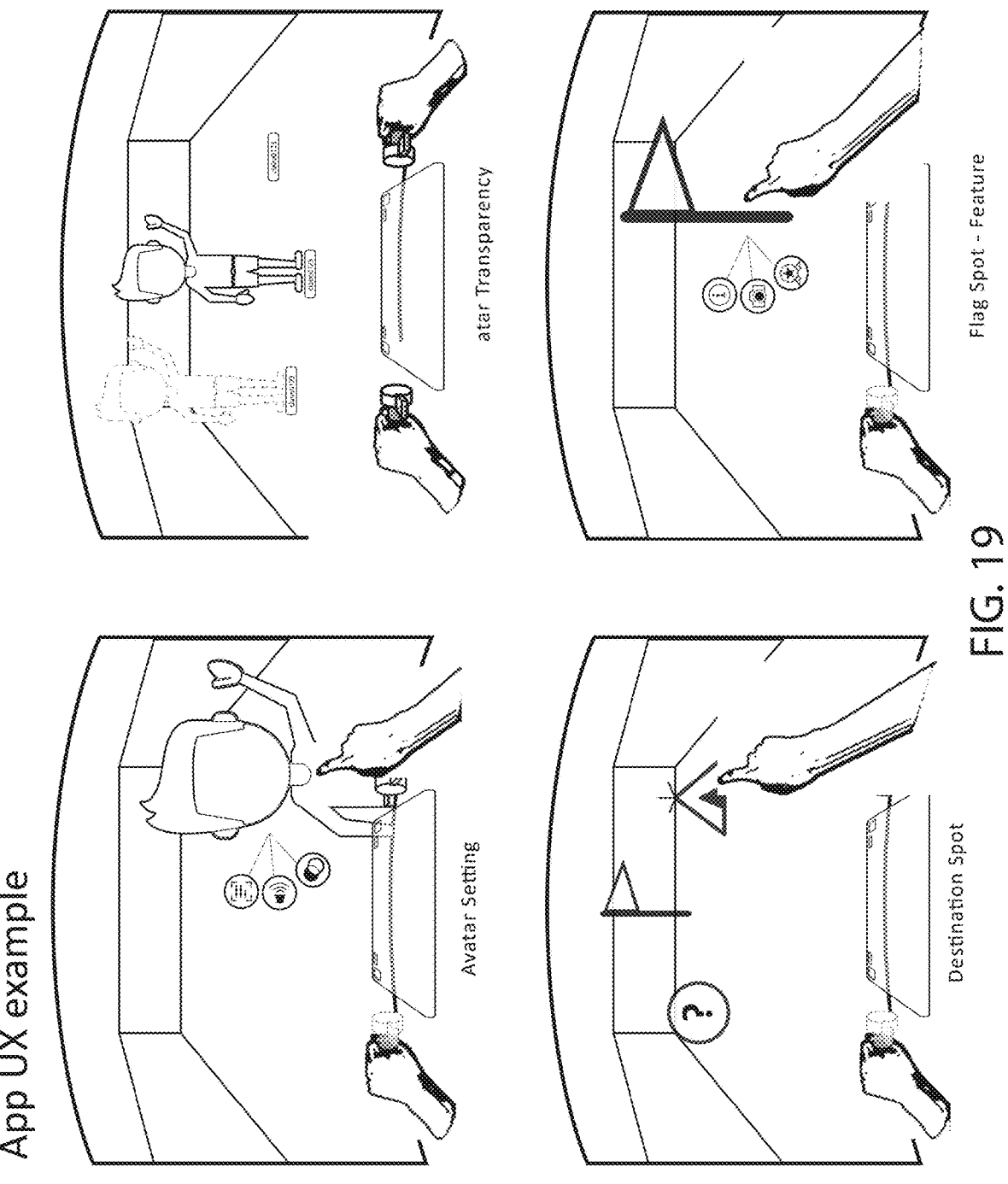
FIG. 19 illustrates an example application user experience (UX), in accordance with an embodiment.

FIG. 19 illustrates an example application user experience (UX), in accordance with an embodiment. Specifically, the UX may include several types of graphical icons. In one instance, the experience includes a "visitor center" that corresponds to a question mark icon. This may be the starting point for the user's walk. If a user is leading the walk, the user may start at this point. If the user is a guest, the guest user may start from either the meeting spot or the visitor center. In one instance, the experience also includes a flag spot that corresponds to a flag icon. This designated area is optimized for group or selfie photos, featuring highly detailed 3D scans. Users can also earn rewards, such as patches or in-app coins, at these locations. Utilizing the Flag Icon, users can capture group or selfie photos with enhanced features. Additionally, users can collect reward patches or game coins for added benefits.

In one instance, the experience includes a meetup spot corresponding to a tent icon. This corresponds to the exact location where a user has arranged to meet the user's friends. The user can also send invites to this spot. In one instance, the avatar transparency (ID Name Tag Followed by Avatar) feature enables the adjustment of avatar visibility, including friends, other users, or NPCs, by toggling between transparent, semi-transparent, and solid states. This functionality is particularly beneficial for enhancing focus on the environment or managing visibility in densely populated areas. By interacting with avatars, users can mute them to prioritize audio such as music or ambient sounds. Additionally, avatars can be switched to text mode, ensuring that their communications are always readable. Users have the option to engage in chat through text, voice-to-text, or scribble-to-text interfaces.

FIG. 20 illustrates an example user experience (UX) layout example, in accordance with an embodiment. The top interface illustrates various types of trails, including "Yosemite National Park." When selected by the user (via the control station assembly 105), the bottom interface shows details of the map of the trail and other factors such as total distance, walk time, and a description. When entering the virtual trail, the scenery may resemble the actual trail at Yosemite National Park.

FIG. 21 illustrates a method of triggering virtual input elements on an user interface of a virtual environment, in accordance with an embodiment. The steps of FIG. 21 may be performed by, for example, a computer system or the online system comprising one or a combination of the control station, the Takawa application, and/or any other appropriate components of the VR headset 107.

In one embodiment, the computer system generates a user interface within a virtual reality environment. The computer system detects 2100 one or more tracking sensors of a control station of a virtual reality (VR) system, wherein the control station is a physical station, and wherein the control station includes a pad. The computer system generates 2110 a layout of one or more input elements on the user interface. The computer system detects 2120 an input signal by a user on the pad. The computer system detects 2130 a location of the input on the pad and translating the location on the pad to a corresponding location within the user interface. The computer system triggers 2140 an input element at the corresponding location in the user interface generate one or outputs on the user interface as a result of the trigger.

Additional Considerations

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An apparatus for a virtual reality (VR) system, comprising:
a tracking pad comprising at least a first conductive print layer, a resistance material layer on the first conductive print layer, and a second conductive print layer on the resistance material layer;
a rail formed to surround at least a portion of the tracking pad, wherein the rail is formed with a groove;

a hub station configured to receive sensing signals from the tracking pad when a user performs one or more steps on the tracking pad;

a walker with one or more wheels, the one or more wheels coupled to fit in the curved groove of the rail, such that the user can rotate the walker, and wherein the walker includes one or more handles for the user to grip.

2. The apparatus of claim 1, wherein the tracking pad further comprises a polyester with polyurethane (PU) coating on the second printed circuit layer.

3. The apparatus of claim 1, wherein the tracking pad further comprises an infrared transmitter light emitting diode (LED) array below the first printed circuit layer.

4. The apparatus of claim 1, wherein the first conductive print layer or the second conductive print layer is a carbon printed circuit.

5. The apparatus of claim 1, further comprising a tray attached to the walker.

6. The apparatus of claim 1, further comprising a control station, the control station including one or more inertial measurement unit (IMU) sensors for detecting rotation of the walker, wherein the control station is configured to receive rotation signals from the one or more IMU sensors when the user rotates the walker around the rail.

7. The apparatus of claim 1, further comprising a control station, the control station including one or more gyroscope sensors for detecting rotation of the walker, wherein the control station is configured to receive rotation signals from the one or more gyroscope sensors when the user rotates the walker around the rail.

8. The apparatus of claim 7, wherein the control station comprises a microcontroller, a battery, a first conductive print layer, an insulating layer on the first conductive print layer, a second conductive print layer on the insulating layer, a case, and infrared light emitting diode arrays on the handles.

9. The apparats of claim 8, wherein the control station further comprises an infrared transmitter light-emitting diode (LED) array.

10. The apparatus of claim 1, further comprising a control station configured to detect sensing signals from a microcontroller and sensors when a user rotates left or right using the walker on the rail.

11. The apparatus of claim 1, wherein each of the one or more handles are formed with an electric brake.

12. An apparatus for a virtual reality (VR) system, comprising:

a tracking pad comprising at least a first conductive print layer, a resistance material layer on the first conductive print layer, and a second conductive print layer on the a resistance material layer;

a rail formed to surround at least a portion of the tracking pad, wherein the rail is formed with a groove;

a walker with one or more wheels, the one or more wheels coupled to fit in the curved groove of the rail, such that the user can rotate the walker, and wherein the walker includes one or more handles for the user to grip; and a control station, the control station including one or more inertial measurement unit (IMU) sensors for detecting rotation of the walker, wherein the control station is configured to receive rotation signals from the one or more IMU sensors when the user rotates the walker around the rail.

* * * * *